2,352,935

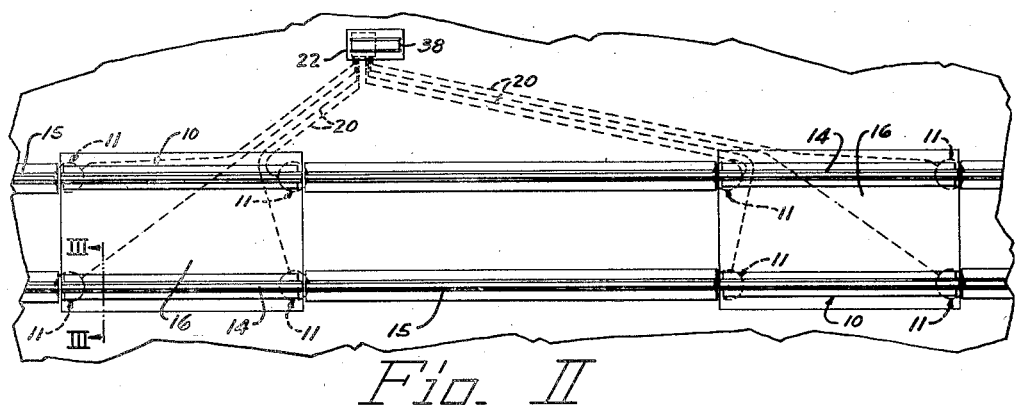
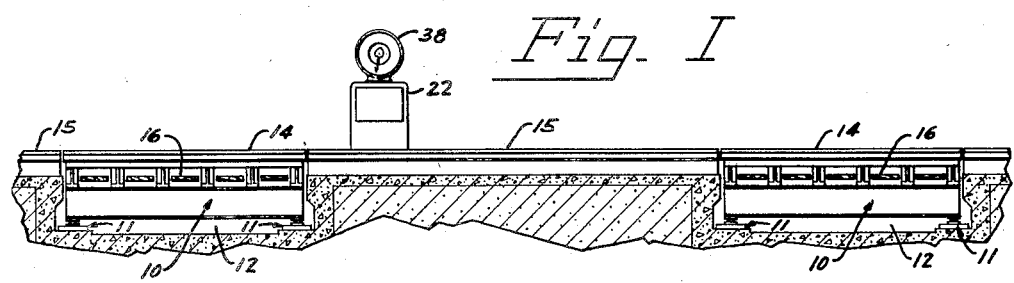
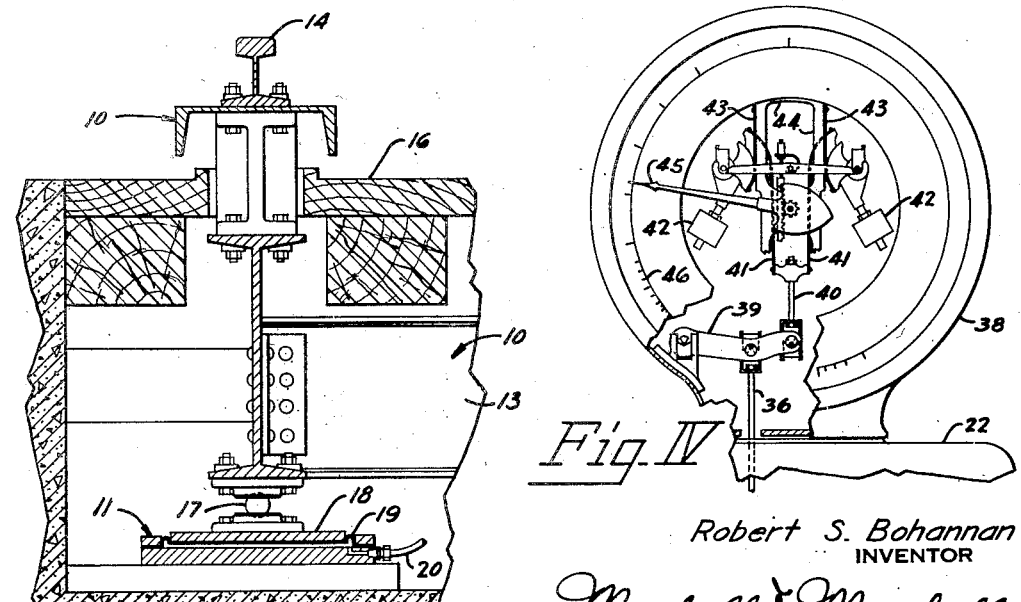
Robert S. Bohannan
INVENTOR
BY Marshall & Marshall
ATTORNEYS

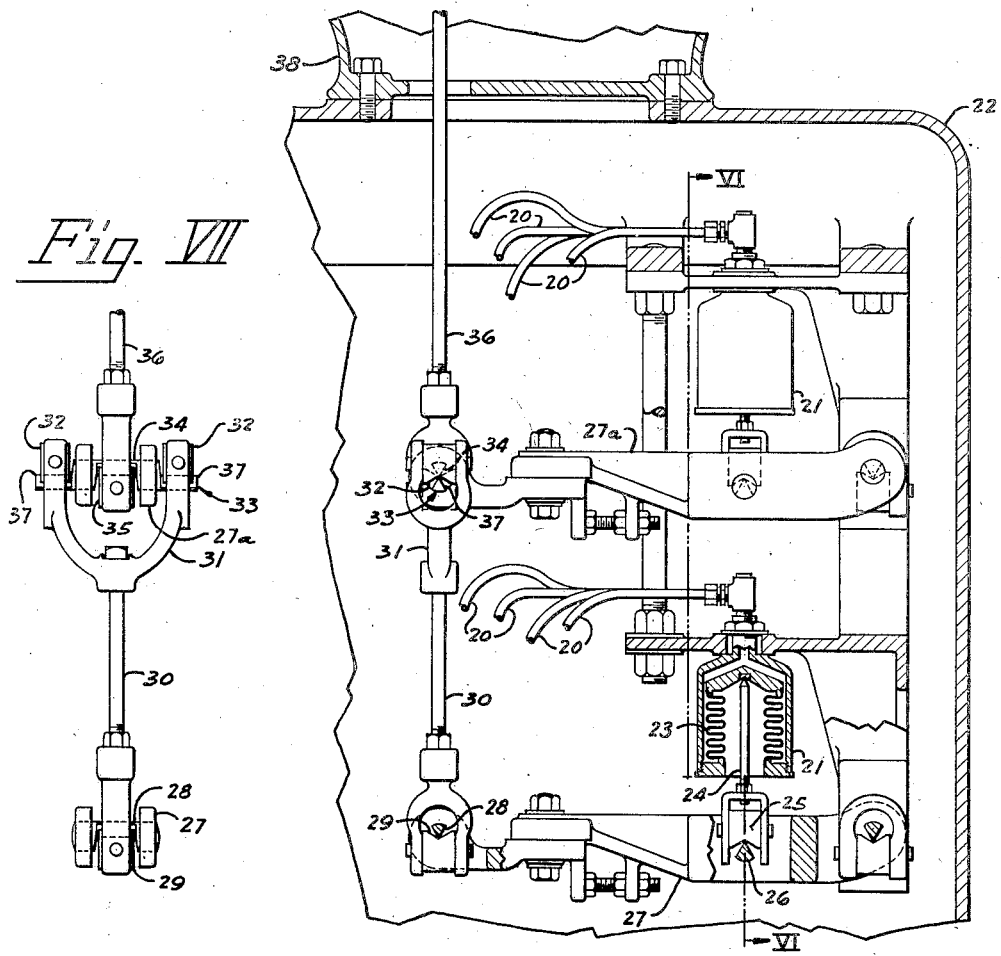
Fig. VII
Fig. V
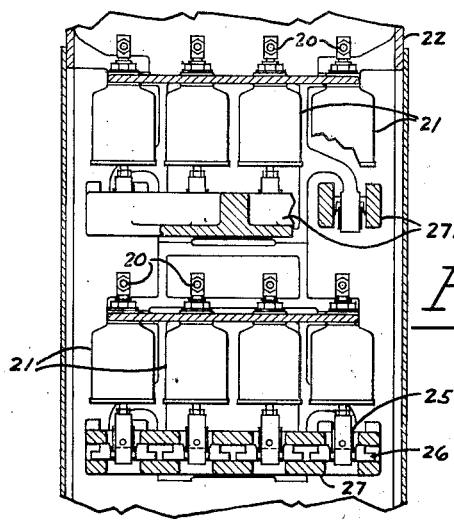
Fig. VI
Robert S. Bohannan
INVENTOR
BY Marshall & Marshall
ATTORNEYS

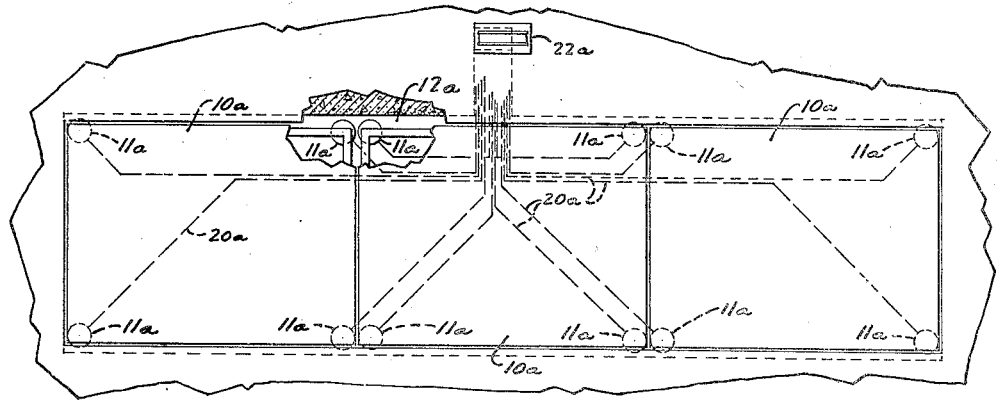
Fig. VIII
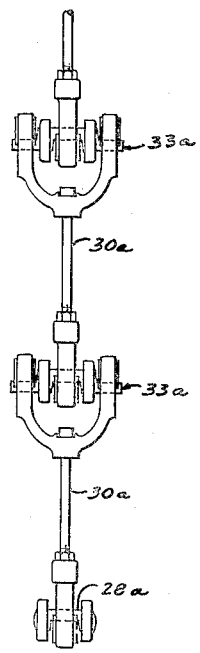
Fig. X
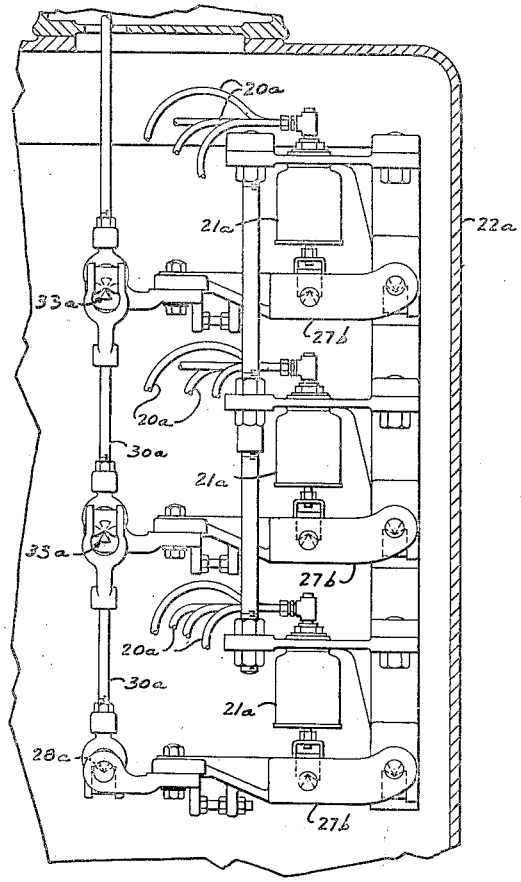
Fig. IX
Robert S. Bohannan
INVENTOR Patented July 4, 1944

UNITED STATES PATENT OFFICE 2,352,935

WEIGHING SCALE

Robert S. Bohannan, Toledo, Ohio, assignor to Toledo Scale Company, Toledo, Ohio, a corporation of New Jersey Application June 13, 1941, Serial No. 397,945

1 Claim. (Cl. 265—47)

This invention relates to weighing scales of the type wherein the force transmission mechanism includes a hydraulic system, and more particularly to a weighing scale of this type for the weighing of railroad cars or other vehicles having long wheel bases.

In the building of scales for the weighing of railroad cars, or long wheel base motor trucks, one of the most serious problems has been encountered in the construction of the platforms. Due to the extreme length of such vehicles, platform structures for this type of scale must consist of heavy structural steel beams braced and supported much in the same manner as a bridge from which construction such platforms derive the name "Weighbridges." These heavy platform support beams are very expensive.

A second problem in the construction of scales of this type arises from the necessity of using long and heavy main platform levers to support the weighbridge and to transmit the load to the head of the scale. The construction of these long and heavy levers is even more difficult than the weighbridge itself since they must be so made as to permit pivots and bearings to be carefully located so that the corners of the scale can be properly "sealed out."

A third major problem in the construction of such scales results from the deep and long pit which must be excavated, braced and lined with concrete to provide a space within which the main levers and the heavy platform beams can be located. The construction of this pit is at best a lengthy and expensive operation.

By far the greater proportion of the total installed cost of such a railroad track or motor vehicle scale is represented by the steel for bracing the platform, the material for and fabricating cost of the large main levers and the expense of excavation and lining the scale pit.

It is an object of this invention to provide a scale for the weighing of railroad cars or long wheel base motor vehicles in which the common long, heavy, and expensive weighbridge is eliminated.

It is a further object of this invention to provide a weighing scale of this type in which the ordinary heavy and expensive main platform levers are entirely eliminated.

It is a further object of this invention to provide a weighing scale for the weighing of railroad cars, or long wheel base motor vehicles, in the installation of which it is unnecessary to excavate the usual deep and long scale pit.

Still another object of this invention is to provide a weighing scale having a plurality of platforms, each one of which is adapted to receive certain wheels of the vehicle being weighed and on each one of which, if desired, weighing can be done without use of the other platforms.

More specific objects and advantages are apparent from the description, in which reference is had to the accompanying drawings illustrating a preferred form of scale embodying the invention.

In the drawings:

Fig. I is a view in front elevation of a scale embodying the invention, the ground level being broken away to more clearly show the platform construction.

Fig. II is a plan view of the scale illustrated in Fig. I.

Fig. III is an enlarged vertical sectional view taken on the line III—III of Fig. II.

Fig. IV is an enlarged fragmentary elevational view of the weight counterbalancing and indicating mechanism.

Fig. V is a further enlarged fragmentary vertical sectional view of the pressure responsive elements of the scale and their associated parts.

Fig. VI is a somewhat reduced vertical sectional view taken on the line VI—VI of Fig. V.

Fig. VII is a detailed view in elevation of a member of the force combining mechanism of the scale.

Fig. VIII is a plan view of a scale embodying a modification of the invention.

Fig. IX is an enlarged fragmentary vertical view in elevation similar to Figure V but showing the associated parts as used in the scale illustrated in Fig. VIII.

Fig. X is a detailed view in elevation of a member of the force combining mechanism of the scale illustrated in Fig. VIII.

These specific drawings and the specific description that follows merely disclose and illustrate the invention and are not intended to impose limitations upon the claim.

Certain mechanism illustrated generally in the accompanying drawings but which does not constitute part of the instant invention is fully described in my copending application Serial No. 299,832, filed Oct. 17, 1939, now Patent No. 2,313,509, and such mechanism therefore is described herein only in such detail as will suffice to enable the connection of the instant invention therewith to be clearly understood.

Two or more platform structures 10 are supported upon capsules 11, located within the shallow pits 12. The platform structures 10 consist of frame members 13 which support live weighing rails 14 in line with the dead rails 15 of the siding on which the scale is located. Dead decks 16 are constructed over the scale pits 12 to prevent the accumulation of refuse and water therein.

Each of the platform structures 10 is supported, by means of balls 17, upon upper plates 18 of the capsules 11. The capsules 11 are arranged in the scale pits 12 as shown in Figures I and II. The upper capsule plates 18 are supported upon flexible diaphragms 19 which confine a quantity of liquid within the capsules 11. Attached to each of the capsules 11 is a pipe 20 which leads from the pits 12 to the head of the scale where it is connected to its respective pressure responsive chamber 21 (Fig. V). The pressure responsive chambers 21 are mounted on brackets within the main scale housing 22 (Fig. I). Located within each of the pressure responsive chambers 21 is a vertically disposed metallic bellows 23 (Fig. V) having an open lower end through which extends a strut 24 having attached to its lower end a clevis-held bearing 25.

The space within the pressure responsive chamber 21, between its walls and the metallic bellows 23, is in communication with the respective capsule 11 by means of the pipe 20.

Each of the bearings 25 rests on an individual load pivot 26 of a shelf lever 27. For each platform structure 10 there is a corresponding shelf lever 27 which is fulcrumed on a bracket carried by the housing 22; these shelf levers 27 being located one above the other and parallel to each other. The lowermost shelf lever 27 has a nose pivot 28 in the end opposite its fulcrum point which rests in a bearing 29 attached to the lower end of a vertical pull rod 30. The vertical pull rod 30 carries a two-armed yoke 31 at its upper end, in each arm of which there is located a bearing 32. The upper shelf lever 27a has a double directional nose pivot 33 in the end opposite its fulcrum point. The nose pivot 33 has a downwardly turned knife edge 34 which rests in a bearing 35 carried in the lower end of a vertical actuating rod 36. The nose pivot 33 also has two upwardly turned knife edges 37 on which rest the bearings 32 of the yoke 31 connected to the upper end of the vertical pull rod 30. The vertical actuating rod 36 extends upwardly, through the main housing 22, into a dial housing 38 where it is connected, through a multiplying lever 39, a tie rod 40 and metallic ribbons 41, to weight counterbalancing pendulums 42 which are supported by metallic ribbons 43 on a subframe 44 mounted within the dial housing 38. An indicator 45 is connected to the pendulums 42 and swings over a chart 46 to indicate the total weight of the loads placed upon one or all of the platform structures 10.

When a railroad car is placed upon the live rails 14, the load creates a pressure in the capsules 11 which is transmitted by means of the pipes 20 to the pressure chambers 21. The capsules 11, supporting one of the platform structures 10, are all individually connected to the pressure responsive chambers 21 which actuate one of the shelf levers 27 or 27a. Since the shelf lever 27 for example, is connected to the weight counterbalancing mechanism, by means of the pull rod 30, the yoke 31, the pivot 33 and the actuating rod 36, a load placed upon the platform structure associated with the shelf lever 27 will be indicated on the dial 46 by means of the indicator 45. Similarly, a load placed upon another one of the platforms of the scale acting, for example, on shelf lever 27a, will be shown by the indicator 45 on the chart 46 through the connections between the shelf lever 27a, the pivot 33 and the actuating rod 36.

The total load of a railway car, positioned with one of its trucks upon each of the platform structures 10, will be shown on the dial 46 by the combined forces transmitted to the shelf levers 27 and 27a, the total of which forces acts upon the counterbalancing mechanism, through their interconnection at the double directional nose pivot 33.

Figures VIII, IX and X illustrate a scale embodying a modification of the invention. Three or more platforms 10a are supported upon capsules 11a located within a scale pit 12a. The construction of the capsules 11a is identical with the construction of the capsules already described. In this case, however, the platforms 10a are intended for the weighing of long wheel base motor vehicles, and in particular multiple wheeled combination trucks and semi-trailers and are, therefore, "live decks" supported directly upon the capsules 11a. Attached to each of the capsules 11a is a pipe 20a, which leads from the capsule 11a to the head of the scale where it is connected to its respective pressure responsive chamber 21a.

The pressure responsive chambers 21a are arranged in groups corresponding to the grouping of the capsules 11a which support each of the platforms 10a. Each of these groups of pressure responsive chambers has, associated with it, a shelf lever 27b, which is fulcrumed in a bracket carried by the housing 22a and serves to combine the forces exerted in the individual pressure responsive chambers 21a of the group. Each of the shelf levers 27b and their associated parts are identical with the shelf levers 27 or 27a (Fig. V). The principal difference between the scale illustrated in Figure VIII and that illustrated in Figure II is the addition of another platform structure 10a and another "tier" comprising a group of pressure responsive chambers 21a, a shelf lever 27b, an additional vertical pull rod 30a and double directional nose pivot 33a.

As described with reference to the scale illustrated in Figure II, a load can be weighed upon the scale illustrated in Figure VIII employing any or all of the platform structures 10a, depending upon the length of the wheel base of the motor vehicle being weighed.

The principle of the combining levers 27, and the combining vertical pull rods 30, is such that regardless of the number of platforms 10, the pressure created by that portion of the total load which rests on each of the platforms of the scale will be combined with that created by that portion of the load on each of the other platforms and transmitted to the weight counterbalancing and indicating members of the scale so that the total weight of the entire load will be correctly indicated. For example: if a railway car were being weighed on the scale illustrated in Figure II, 75 per cent of the total weight of the car being supported by one of the platforms and 25 per cent by the other, the indication on the scale would be the full 100 per cent of the load. The pressure created in each of the individual hydraulic systems comprising a capsule 11, associated pipe 20 and pressure responsive chamber 21, would be combined by the shelf lever 27 to exert a pull proportional to the load carried by the individual platform associated with that particular shelf lever 27. One shelf lever would thus exert a 75 per cent pull which would be combined with and augmented by the 25 per cent pull being exerted by the other shelf lever by means of the double directional nose pivot 33 and its associated parts. When the shelf lever exerting the 75 per cent pull, moved the vertical actuating rod 36 downward a sufficient amount to cause the load counterbalancing mechanism to counterbalance this force, the pull rod 30 would also have been moved downwardly. The 25 per cent pull exerted by the other shelf lever 27 would cause that shelf lever to "follow-up" the balance of the mechanism, and, having followed, it would still be exerting a 25 per cent pull. Since the load counterbalancing mechanism would have, thus far, only counterbalanced the 75 per cent pull, it would now move further to counterbalance the additional 25 per cent. Similarly, the shelf lever exerting the 75 per cent pull would "follow-up" the remaining 25 per cent movement of the mechanism.

As a second example: if a motor vehicle were being weighed on the scale illustrated in Figure VIII, and all of the platforms shown were employed in the weighing operation, the combining of the total load would be similar to that which is described. If, however, the vehicle had a short wheel base, the third platform would have no load at all upon it. Since the shelf lever 27 associated with this third platform is interconnected with the other shelf levers 27, the zero load of the third platform would cause it to "follow-up" the balance of the mechanism. Thus, all of the platforms will rise and fall together regardless of how many of them are being used in the actual weighing operation.

The embodiments of the invention that have been disclosed may be modified to meet various requirements.

Having described the invention, I claim:

In a weighing scale, in combination, a plurality of load receivers, a load counterbalancing device, a plurality of capsules supporting each of said load receivers, a plurality of pressure responsive chambers, each of said capsules being in communication with one of said chambers, said chambers being associated in groups, a combining lever actuated by each of said groups of pressure responsive chambers and vertically disposed linkage members connecting each pair of neighboring combining levers, said linkage members holding said combining levers parallel to each other and all of said linkage members constituting a connection for transmitting force to said load counterbalancing device.

ROBERT S. BOHANNAN.